(12) United States Patent  (10) Patent No.: US 7,227,274 B2
Berkson  (45) Date of Patent: Jun. 5, 2007

(54) METHOD FOR CREATING ENERGY SOURCES FOR A VEHICLE DRIVE SYSTEM

(76) Inventor: Bruce R. Berkson, 190 Redstone Dr., Sedona, AZ (US) 86336

( * ) Notice: Subject to any disclaimer, the term of this patent is extended or adjusted under 35 U.S.C. 154(b) by 0 days.

(21) Appl. No.: 11/457,229

(22) Filed: Jul. 13, 2006

(65) Prior Publication Data
US 2007/0013192 A1    Jan. 18, 2007

Related U.S. Application Data

(60) Provisional application No. 60/597,006, filed on Nov. 3, 2005, provisional application No. 60/595,552, filed on Jul. 14, 2005.

(51) Int. Cl.
*F02N 11/06* (2006.01)
*F02D 29/06* (2006.01)
*H02P 9/04* (2006.01)
(52) U.S. Cl. .................................. 290/40 R; 290/40 C
(58) Field of Classification Search ............... 290/1 R, 290/54, 43, 40 R, 40 C; 60/39.5, 286, 274
See application file for complete search history.

(56) References Cited
U.S. PATENT DOCUMENTS
3,157,793 A * 11/1964 Adkins ................... 290/52

| | | | | |
|---|---|---|---|---|
| 4,290,267 A * | 9/1981 | Buchner | ................ | 60/648 |
| 5,852,927 A * | 12/1998 | Cohn et al. | ................ | 60/780 |
| 6,361,757 B1 * | 3/2002 | Shikada et al. | ............ | 423/651 |
| 6,373,145 B1 * | 4/2002 | Hamrick | .............. | 290/44 |
| 6,380,637 B1 * | 4/2002 | Hsu et al. | .............. | 290/1 R |
| 6,960,840 B2 * | 11/2005 | Willis et al. | ............. | 290/52 |
| 7,065,958 B2 * | 6/2006 | Funk et al. | ............. | 60/286 |
| 7,117,669 B2 * | 10/2006 | Kaboord et al. | ........... | 60/288 |
| 2004/0160061 A1 * | 8/2004 | Rouse et al. | ............ | 290/52 |
| 2006/0055175 A1 * | 3/2006 | Grinblat | ............. | 290/54 |
| 2006/0063046 A1 * | 3/2006 | Hu et al. | ............. | 429/17 |

* cited by examiner

*Primary Examiner*—Julio Gonzalez
(74) *Attorney, Agent, or Firm*—Kelly Lowry & Kelley, LLP

(57) ABSTRACT

The method for creating energy sources for a vehicle drive system includes burning an air fuel mixture in an internal combustion engine and discharging the burned air fuel mixture through an exhaust system of the vehicle. Steam is created utilizing heat of the exhaust system. The steam is passed through a generator which supplies mechanical or electrical power to an appropriate drive system of the vehicle. Hydrogen can be created utilizing the steam and a catalyst substrate. Wind turbines mounted to the vehicle can also supply electricity to the vehicle as air passes through the turbines due to movement of the vehicle.

21 Claims, 6 Drawing Sheets

METHOD FOR CREATING ENERGY SOURCES FOR A VEHICLE DRIVE SYSTEM

BACKGROUND OF THE INVENTION

This invention relates generally to drive systems and energy sources for automobiles. More specifically, this invention relates to an improved drive system for an automobile that generates motive force from multiple sources.

For many years, most vehicles, including cars, trucks and the like, have relied upon an internal combustion engine fueled by petroleum products as its drive system. Such engines incorporate intake valves for introducing an air fuel mixture into a cylinder, a piston for compressing the air fuel mixture, means for igniting the compressed air fuel mixture, and exhaust valves for removing the burned air fuel mixture from the engine and out an exhaust system. Such engines have traditionally run on gasoline or diesel fuels. The advantages of such internal combustion engines are well-known, including having high power, speed and range. However, there are many disadvantages to such internal combustion engines, including both fuel efficiency and high emissions.

Recently, the automotive industry has been developing automobiles that rely on alternative fuel sources, such as electricity, hydrogen, natural gas and the like. The idea of using electric only powered cars has been in place for decades. However, such cars have too many disadvantages, including low speeds, low range or distance to be traveled, heavy and inexpensive batteries, etc. Hydrogen or fuel cell-based technology is currently not feasible due to the technological hurdles which must be overcome and the high cost of such vehicles.

More recently, hybrid vehicles have been introduced into the marketplace with much greater success. Such vehicles typically use a combination of gasoline and electric sources of power as their drive systems. The internal combustion engine which runs on traditional petroleum fuels is used to initially propel the vehicle, and assist the electric drive system, such as when climbing hills and the like. Aside from batteries containing electricity, the car itself is designed so as to regenerate electricity due to the braking of the car, which electricity is transferred to the battery for operating the vehicle to the greatest extent possible from the electrical drive system. However, these vehicles, while having high fuel efficiency and low emissions, in many cases do not have the power or speed of more traditional vehicles running solely on internal combustion engines. Nonetheless, with the increasing cost of gasoline, hybrids have become a more attractive option to consumers. In fact, the Brazilian automotive company ZAP has recently introduced a vehicle driven by gasoline, electricity, and alcohol fuel sources.

There is a continuing need for a multi-source vehicle drive system for improving fuel efficiency, lowering emissions, yet still providing sufficient power, speed and range. The present invention fulfills these needs, and provides other related advantages.

SUMMARY OF THE INVENTION

The present invention resides in a method for creating energy sources for a vehicle drive system. The method and system of the present invention are particularly adapted for automobiles, such as cars and trucks. The present invention can be incorporated as an original equipment manufacture (OEM) or after market conversion kit allowing existing engine technology to be converted into a multi-source vehicle drive system.

The method of the present invention generally comprises the steps of burning an air fuel mixture in an internal combustion engine of the vehicle. The burned air fuel mixture is then discharged through an exhaust system containing a catalytic converter. Steam is created utilizing the heat of the exhaust system. The steam is passed through a generator which is operably connected to a drive system of the vehicle.

A housing is placed adjacent to, typically behind or surrounding, a catalytic converter of the exhaust system. Water is injected into the housing, typically by spraying the water/vapor onto heated plates of the housing, after the housing reaches a predetermined temperature. The steam is then passed through the generator. The steam may be passed through a Tesla turbine generator, or the steam may be compressed before being passed through other generators. The generator either generates electricity and supplies the electricity to an electric drive system of the vehicle or batteries of the electric drive system of the vehicle, or the generator is operably connected to a mechanical drive system of the vehicle so as to provide direct mechanical power thereto.

In one embodiment of the present invention, hydrogen is created by passing the steam over a catalyst substrate, such as nickel hydride. This may take place in the housing where the steam is generated, or the steam may be mixed with exhaust from the internal combustion engine before it is passed through a catalytic converter of the exhaust system and passed over the catalyst substrate. The hydrogen is collected utilizing a permeable exchange membrane, and the hydrogen is stored in a tank on the vehicle or in a fuel cell.

In another embodiment, or in addition to the embodiments discussed above, a wind turbine is mounted onto the vehicle so as to generate electricity as air passes through the turbine due to movement of the vehicle. The electricity generated by the wind turbine is supplied to a battery or to a voltage regulator of the vehicle's electrical system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention resides in a method for creating energy sources for a vehicle drive system. More particularly, as will be more fully described herein, the present invention incorporates a high power output steam driven electrical generator to augment vehicle drive systems. Systems of the present invention may also incorporate generation of electricity or hydrogen fuel sources. The present invention may be used as an option, such as an after market conversion kit, to an OEM internal combustion driven vehicle, a hybrid vehicle or the like. It will also be appreciated that the vehicle could incorporate the systems and methodologies of the present invention into any used or original equipment manufactured vehicle.

Figure 1:
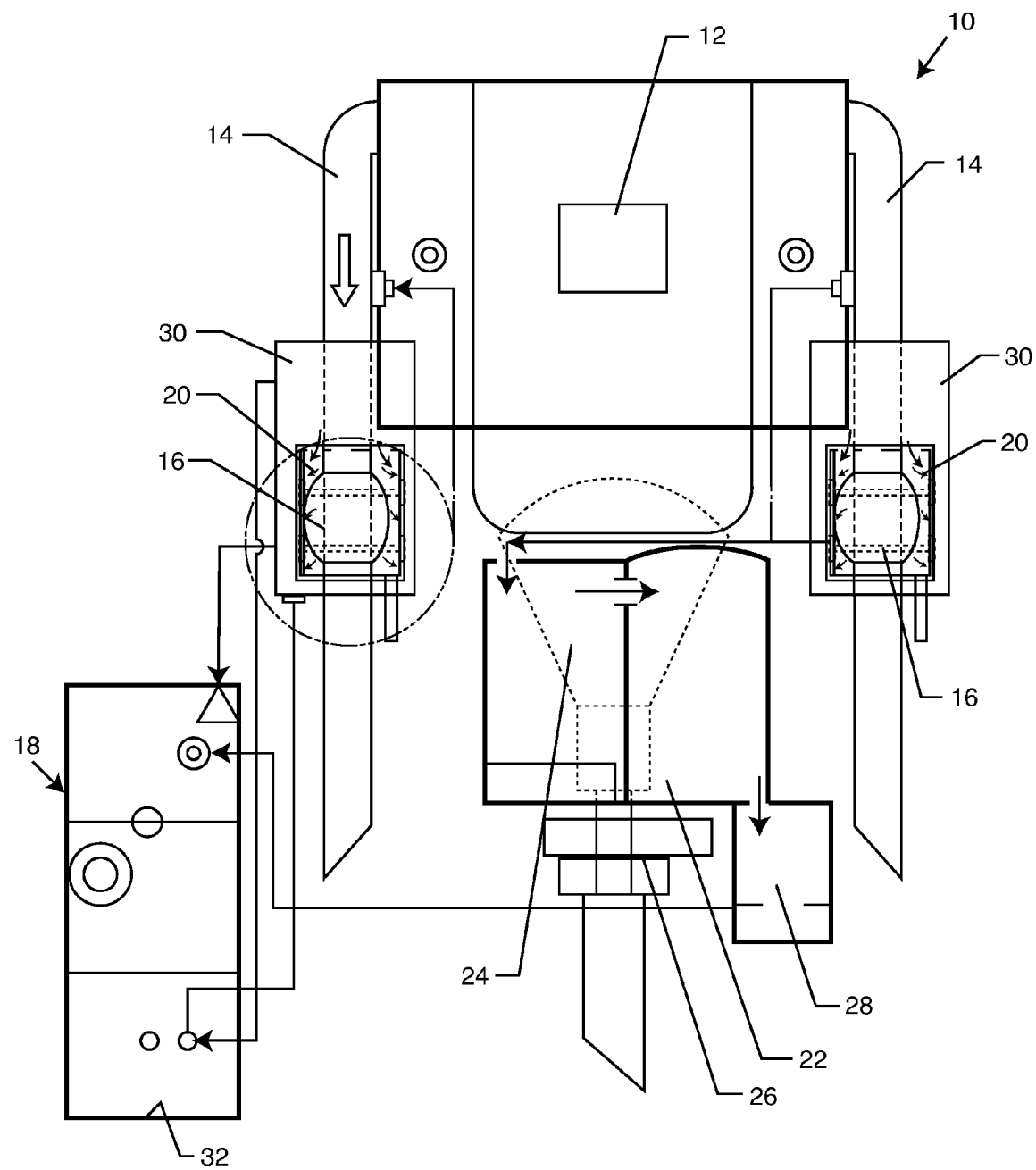
FIG. 1 is a schematic diagram of a vehicle incorporating systems of the present invention, including an electric steam generator.

With reference now to FIG. 1, a schematic diagram is provided of an embodiment of the present invention. The vehicle 10 includes an internal combustion engine 12. The engine 12 typically runs off hydrocarbon fuel sources, such as gasoline, diesel, alcohol-based fuels, blended fuels and the like. Such internal combustion engines are commonly incorporated into vehicles presently. As is known in the art, an air fuel mixture is introduced into combustion chambers of the internal combustion engine 12, and after being compressed and ignited, the burnt air fuel mixture is discharged through an exhaust system which includes one or more exhaust pipes 14 having catalytic converters 16.

For several decades now, catalytic converters have been required to meet EPA air quality standards. The purpose of the catalytic converters 16 is to modify the burnt air fuel mixture so that it is not as toxic to the environment. This is done by passing the burnt air fuel mixture through lattices and honeycombs of catalyst substrates which catalyze and modify various gases and substances. Moreover, the catalytic converter runs at a very high temperature, typically in excess of 1,200° F. which aids in the catalytic reactions, and also can serve to incinerate unburnt fuel and the like. Such processes are well known in the art.

The present invention utilizes the heat given off by the exhaust system, and particularly the catalytic converter, to generate an energy source for a vehicle drive system. The burnt air fuel mixture, upon leaving the combustion chamber, is in excess of 1,000° F. in temperature. Thus, the exhaust pipes and the like are heated to several hundred degrees as the burnt air fuel mixture is passed therethrough. As mentioned above, the catalytic converter itself operates at a very high temperature, usually over 1,200° F.

With reference again to FIG. 1, the present invention includes a water storage tank 18 which supplies water to one or more housings 20 surrounding or placed adjacent to, typically behind, the catalytic converter 16 for generating steam. The generated steam is then passed through a generator 22 which is operably connected to the drive system of the vehicle. Although the generator 22 can be operably connected to the drive system in a mechanical fashion, so as to supply direct mechanical power to a drive line or the like of the vehicle, more typically the generator 22 creates electricity which is then supplied to an electric drive system of the vehicle, such as a battery. In a particularly preferred embodiment, the generator 22 comprises a Tesla turbine in which the steam passes directly therethrough to power an electrical generator and produce a large amount of electricity. In other cases, the steam is passed through a compressor device 24 so as to be compressed to a predetermined pressure before being passed through an electrical generator 22. Although a compressor 24 could be used in association with a Tesla turbine, typically this is not necessary.

As with existing hybrid vehicles, a single chip controller allows the internal combustion engine to cycle on and off when driving with the electric drive train. In accordance with the present invention, the temperature of the exhaust system, and particularly the housing 20 surrounding or placed behind the catalytic converter 16, is monitored until an appropriate elevated temperature is achieved. When the housing 20 reaches the bottom of the operating range, water is injected therein, usually as a steam vapor or a mist, to generate very high temperature steam so as to be passed through the generator 22 to create electricity for the electric drive train of the vehicle. Preferably, the water is pre-heated before being injected so as to create a steam vapor or mist. Such preheating can be accomplished by passing the water through a conduit traveling close to the exhaust system, the housing 20, or any other manner. Moreover, the injector device could be a fogger or nebulizer so as to create a fine mist which will quickly turn into very high temperature steam. As the generation of steam is critical to the present invention, the present invention only operates when the internal combustion is operating and heating the exhaust pipes 14 and catalytic converter 16. Thus, typically, the internal combustion engine 12 runs at idle even if the vehicle is being operated by means of the electric drive train. A centrifugal clutch 26 can be incorporated to allow the compressor 24 to operate even when the engine 12 is at idle. After the steam passes through the generator 22, it is collected in a condenser 28, which serves as a muffler and returns the distilled water to the water storage tank 18 for recycling through the system.

In one embodiment of the present invention, as will be more fully discussed herein, hydrogen is generated by either passing the exhausted steam over a catalyst substrate within housing 20, or mixing steam with discharged unburnt air fuel mixture in a precatalyst hydrogen reformer disposed upstream of the catalytic converter 16. The precatalyst hydrogen reformer includes a non-semi precious metal catalyst, such as zinc, coated surfaces causing a catalytic reaction separating hydrogen molecules from carbon, nitrogen and oxygen molecules of unburned exhaust hydrocarbons. A pump then supplies the hydrogen collected through a permeable exchange membrane to a hydrogen storage tank 32, which hydrogen can be utilized in a drive system of the vehicle or siphoned off later for other purposes.

Figure 2:
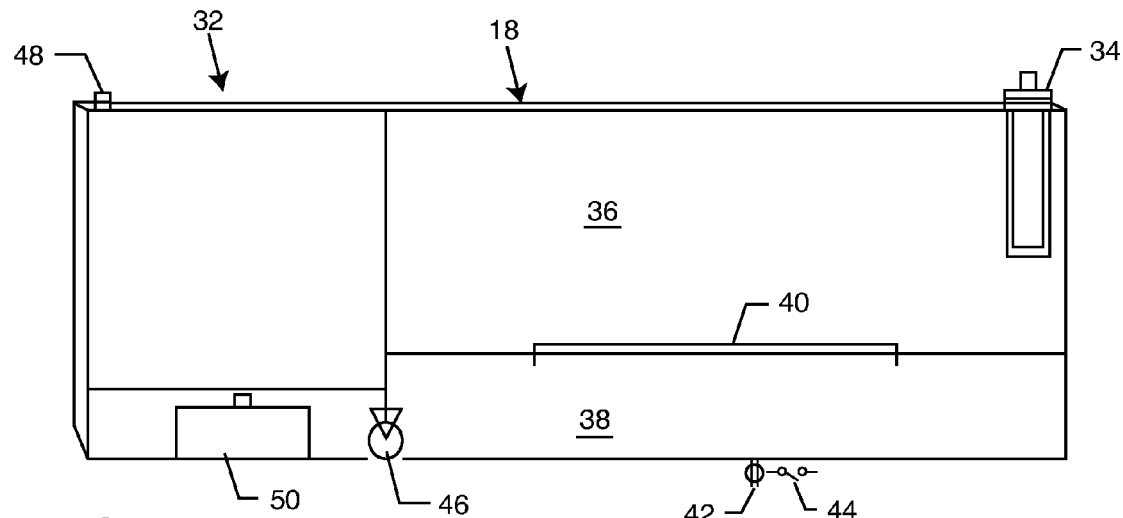
FIG. 2 is a schematic diagram illustrating storage tanks used in accordance with the present invention.

With reference now to FIG. 2, in a particularly preferred embodiment, the water storage tank 18 includes a filter 34 for filtering water entering into the tank, or even water being recirculated into the tank 18. Moreover, preferably, the storage tank 18 includes two compartments 46 and 38 separated by a reverse osmosis membrane 40 or other appropriate filter. Distilled, purified water is preferred so that the processes of the present invention can be accomplished. A pump 42 and valve or switch 44 are operably connected to the storage tank 18 or a water line extending therefrom so as to pump water into the system during operation. The tank 18 can be insulated so as to contain heat within the winter, or a valve 46 or the like can introduce heated air over the tank 18 to prevent the water from freezing during the winter and other cold climate conditions.

In those cases where the invention incorporates the generation of hydrogen and wherein the hydrogen is not stored in a fuel cell of the vehicle, a hydrogen storage tank 32 is provided. The hydrogen storage tank 32 includes appropriate inlets and outlets 48 and for safety purposes, as well as maximum storage purposes, includes a refrigeration device 50. Typically, such refrigeration device comprises a low voltage direct current chilling unit. Of course, as will be appreciated by those skilled in the art, the hydrogen storage tank 32 may be eliminated if a fuel cell is used or if the optional hydrogen generation units are not incorporated.

However, even if the vehicle is not adapted to utilize hydrogen as a fuel source, the generation of hydrogen utilizing the present invention may still be desirable. Currently, the General Motors Fuel Cell Project has reportedly been paying $450.00 per gallon of 99.9% pure hydrogen for their current fuel cell work. A recent article has indicated that the eventual price per gallon of hydrogen may drop to the $4.00 to $8.00 range. Thus, the excess hydrogen fuel could be sold to hydrogen fueling stations, to other distributors, or used in other hydrogen-based applications by the user, etc.

Figure 3:
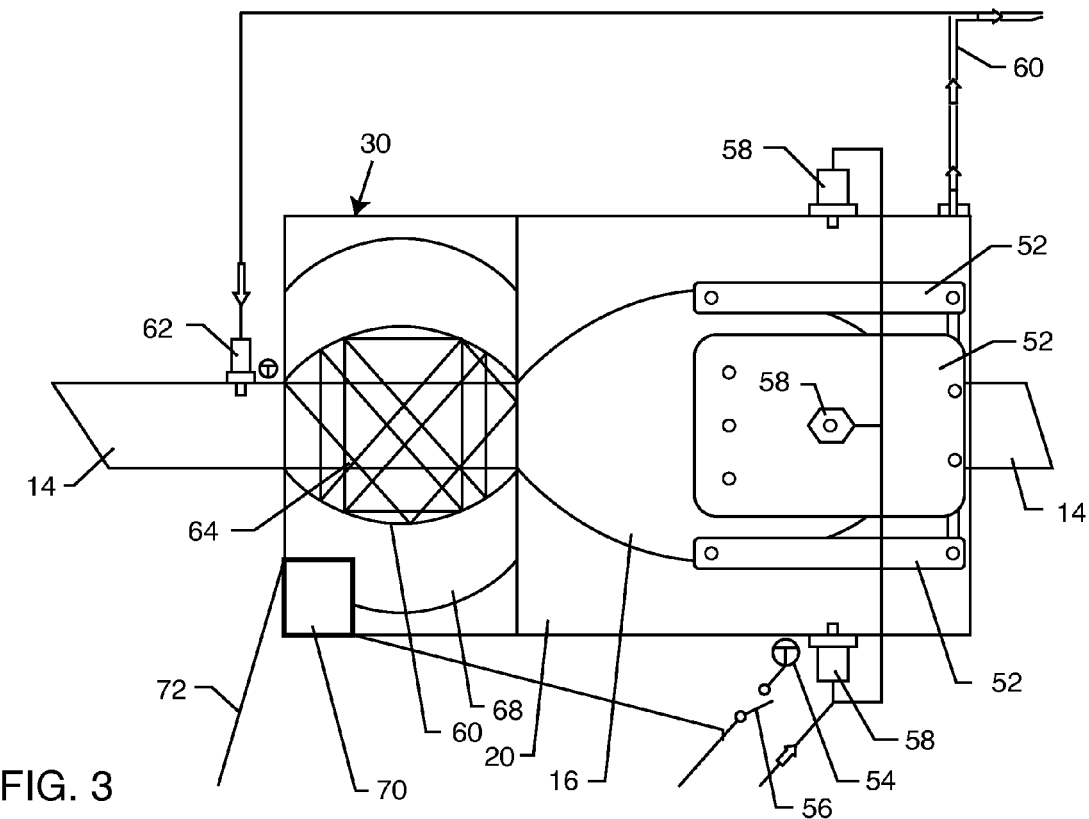
FIG. 3 is a schematic diagram illustrating steam generator and a hydrocarbon fuel processor of the present invention.

With reference now to FIG. 3, in one embodiment of the present invention, the steam housing 20 surrounds the catalytic converter 16. Alternatively, the housing 20 could be integrated with the catalytic converter 16. The housing 20 recaptures much of the free energy heat that is lost from an internal combustion through the catalytic converter 16 and exhaust pipe 14. Flash plates 52 are attached to the catalytic converter 16, such as by bolts or rivets. Heat from the catalytic converter 16 is directly transferred to such flash plates 52. A temperature sensor 54 monitors the temperature of the housing 20, or appropriate portion of the exhaust system, until a minimum operable temperature is attained. At that point, switch 56 is activated such that the pump 42 of the water storage tank 18 is activated, water is introduced into the housing 20, typically by injection through nebulizers 58 or other such devices that serve to spray or mist the water onto the flash plates 52. Due to the fact that the flash plates are heated to at least 400° F., and oftentimes much higher temperatures, the sprayed water from the injectors 58 flash evaporate into steam. This allows the generation of steam, and eliminates the need for a conventional steam boiler. The steam is then circulated, such as through outlet pipe 60 to the steam electrical generator, as discussed above. It will be appreciated by those skilled in the art that the catalytic converter reaches in excess of 1,200° F. within a few minutes of the internal combustion engine operating. When the housing 20 reaches 375° F., the thermostat 54 and 56 activates the water pump so as to inject a controlled stream of water onto the plates 52. Plates 52 will typically be in excess of 400° F., well in excess of the enthalpic temperatures necessary for flash evaporation of the saturated liquid. Thus, a tremendous amount of steam can be generated and circulated through the system. In fact, many gallons of water can be circulated through the system per hour.

With reference again to FIG. 1, in the event that the steam-driven electrical generator 22 requires a compressor 24, the compressor is typically powered by either the drive shaft or electrically. Valves may be placed between the flash steam generator housing 20 and the steam compression tank 24 to assist in the compression. A belt or chain driven centrifugal clutch 26 may be mounted on the drive shaft behind the splined shaft coming out of the transmission. This allows the compressor 24 to operate while the engine 12 is idling. Of course, the centrifugal clutch 26 may be eliminated if an electrical pump is used to power the compressor 24.

The output steam powered electrical generator 22 is mounted on the vehicle's frame and may power electrical drive wheels directly through a battery, such as a 42 volt industrial battery. Excess electricity may be stored in a battery pack or fuel cell. It is contemplated that electrical outlet plugs can be mounted at convenient points around the vehicle to power job sites, campsites, residential utilities, or the like, particularly in conjunction with a fuel cell.

With reference again to FIG. 3, as mentioned above, the present invention can be utilized to generate hydrogen. One method of doing so is to pass steam through an injector 62 so as to mix the steam with discharged, burnt fuel mixture of the exhaust pipe 14. The mixed steam and burnt air fuel mixture is then passed through a pre-catalytic hydrocarbon reformer or fuel processor mounted in line of the exhaust system before the catalytic converter 16. The fuel processor 30 includes a substrate coated with a catalyst. The catalyst is typically non-semi precious metal, such as zinc. Preferably, the reformer device 30 includes a zinc coated honeycomb lattice structure 64. As the lattices 64 heat up to operating temperatures, the low volume steam is introduced through the injector 62, mixing with the unburned hydrocarbons in the engine exhaust. This mixture of steam and hydrocarbons is processed upon contact with the lattices, at which point hydrogen molecules are filtered from the remaining nitrogen, carbon and oxygen molecules that are subsequently incinerated in the catalytic converter 16. The hydrogen passes through a permeable exchange membrane 66 adapted to allow only the hydrogen to pass therethrough into a collection area 68. A hydrogen pump 70 pumps the hydrogen through a return line 72 to the hydrogen storage tank 32, fuel cell or the like.

Figure 4:
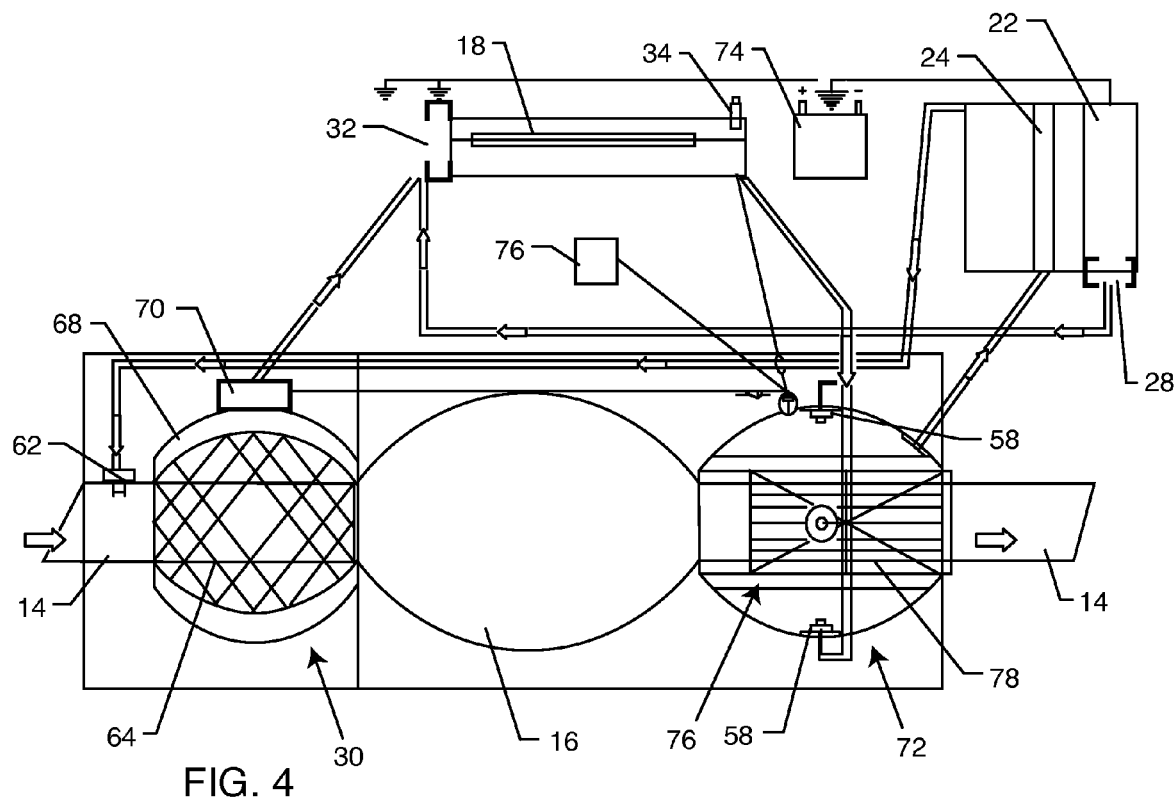
FIG. 4 is a schematic diagram of another steam generator and hydrocarbon fuel processor used in accordance with the present invention.

With reference now to FIG. 4, a schematic diagram of an alternative embodiment of the present invention is shown. In this case, however, instead of the steam generator housing 20 being incorporated into or surrounding the catalytic converter 16, the steam generator housing 72 is mounted on the exhaust pipe 14 behind the catalytic converter 16. This configuration places the steam generator housing 72 behind, or downstream from, the catalytic converter 16 and eliminates the possibility that the flash steam process will cool the catalytic converter below its optimum temperature, thereby keeping the converter EPA compliant. Similar to that described above, water or steam vapor is injected/sprayed through nozzles 58 onto housing surfaces, plates, etc., which are super heated by the heat exchanger element in close proximity to the catalytic converter 16. Typically, the nozzles 58 are opened or pumped water after a minimum operable temperature is attained, typically above 400° F. The flash evaporation creation of steam is then directed to a steam-driven electric generator 22, and if necessary, compressed using compressor 24. Electricity is then supplied to an electric drive system of the vehicle, typically a battery 74.

It will be appreciated by those skilled in the art that the number or size of batteries 74 can be significantly reduced as electricity is continuously supplied to the batteries 74 while the vehicle is in operation. Of course, this also significantly increases the effective range of the vehicle when driven primarily or even exclusively by the electric drive system. The internal combustion engine merely need idle so as to produce the hot exhaust fumes of the burnt air fuel mixture to generate the steam and electricity. Of course, as the internal combustion engine can be operated at much higher levels or RPMs depending upon the need, such as traveling up a hill, accelerating from a stopped position, etc. Obviously, this will result in a very high fuel efficiency. An on-board computer, controller 76 or the like can be used to alternate between the internal combustion engine driven system and the electrical driven system, or other systems, as well as monitoring temperatures and pumps and the like.

Figure 5:
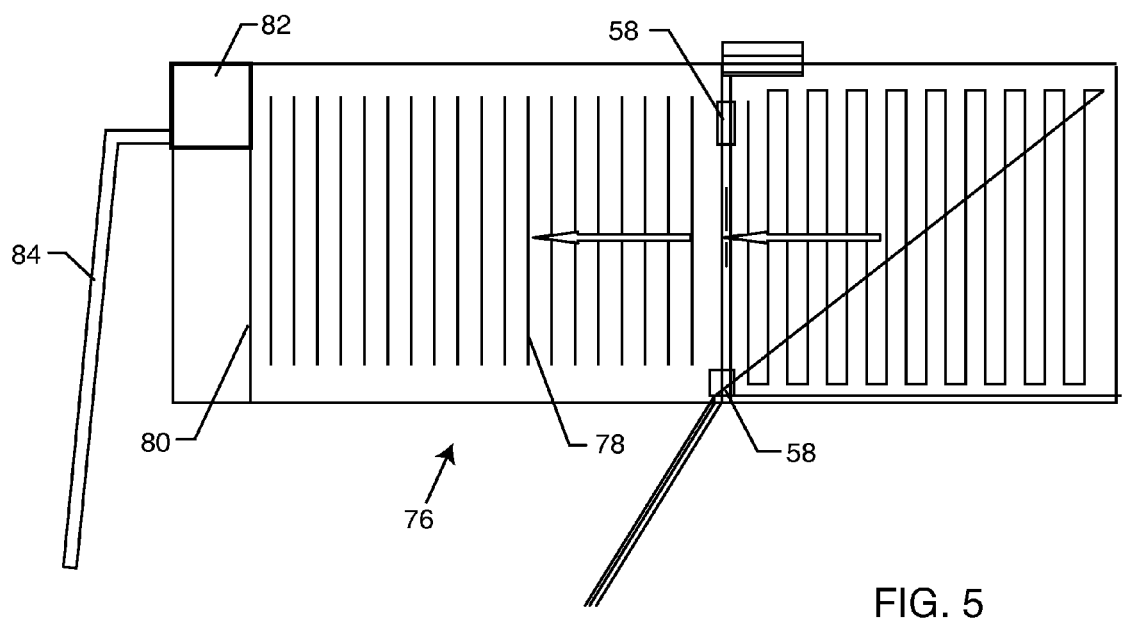
FIG. 5 is a schematic diagram of a steam condenser and hydrogen generator used in accordance with the present invention.

As shown in FIG. 4, the system can incorporate the pre-catalyst hydrocarbon reformer or fuel processor 30, as described above. Alternatively, or in addition to, the present invention can incorporate a condenser hydrogen generator 76. The condenser hydrogen generator creates a closed loop that returns water to a filtered portion of a water storage tank 18. The hydrogen generator 76 reduces emissive heat and sound, acting as a muffler, as well as acting as a heat exchanger to a hydrogen catalyst. The hydrogen catalyst consists of a substrate, such as nickel hydride catalyst plates 78, that are heated to a minimum operating temperature, typically at least 375° F. The created steam, or exhaust steam from the electrical generator, passes over the catalyst substrate 78, resulting in the steam being converted from water to hydrogen and oxygen. The hydrogen passes through a permeable exchange membrane 80 and is collected and transferred by pump 82 to hydrogen supply line 84 supplying the hydrogen to a fuel cell, chilled hydrogen storage tank 32, or the like. An exemplary condenser hydrogen generator is illustrated in FIGS. 4 and 5.

The steam is then recirculated through the system until it is condensed and returned to the water storage tank 18. As indicated above, the steam generated in the steam generator housing 72 can be converted to hydrogen immediately, or exhaust steam from the steam-driven electric generator 22 can be used. It will be understood by those skilled in the art that the residual steam may be used to power a second electrical generator, serve as a secondary power source, or power automotive accessories such air conditioning, power steering, etc.

Figure 6:
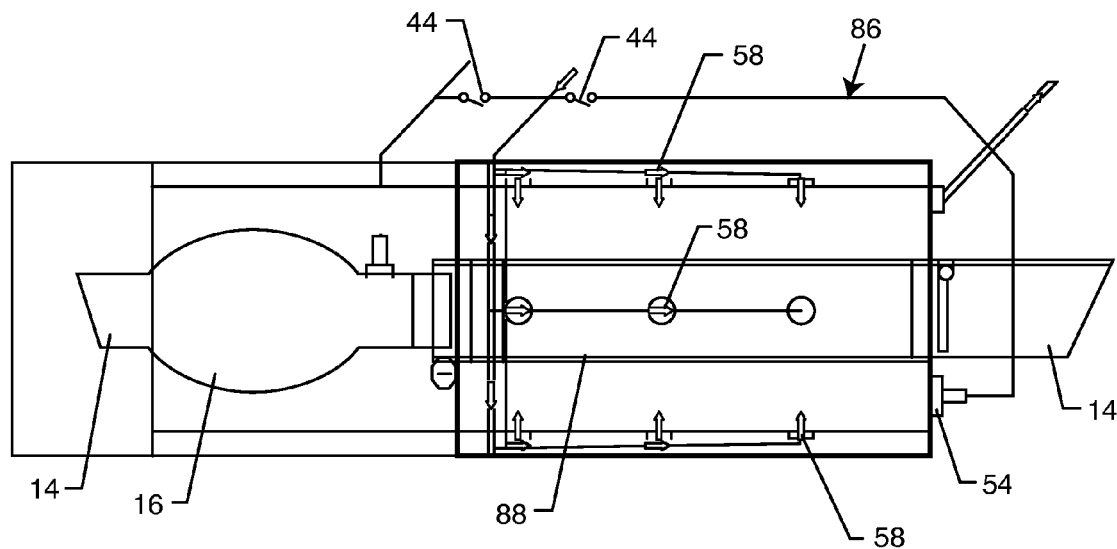
FIG. 6 is a schematic diagram illustrating an alternative steam generator used in accordance with the present invention.
Figure 7:
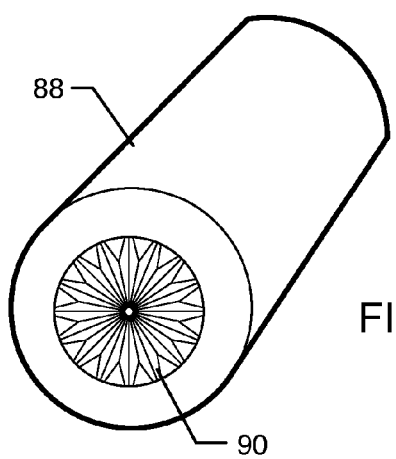
FIG. 7 is a perspective and partially sectioned view of a heat exchanger tube used in accordance with the present invention.
Figure 8:
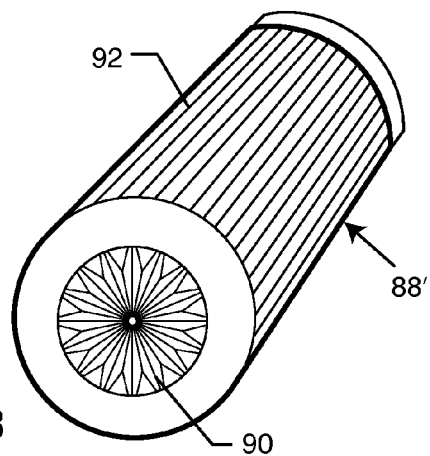
FIG. 8 is a partially sectioned and perspective view of a heat exchanger tube having catalyst plates on an outer surface thereof.

With reference now to FIGS. 6–8, another steam generator housing 86 is shown. This generator housing 86 is also disposed behind or downstream of the catalytic converter 16. It includes a heat exchanger tube 88 which is innerconnected between the catalytic converter 16 and an exhaust pipe 14. It will also be understood that the heat exchanger tube 88 could be disposed along any length of the exhaust pipe 14, provided sufficient temperatures are present. In a particularly preferred embodiment, heat transfer fins 90 are arranged within the hollow heat exchange tube 88 so as to direct the heat towards the outer surface of the heat exchanger tube 88. This is accomplished by directing the discharge exhaust fumes towards the outer surface of the heat exchanger tube 88, as well as being in direct and thermally conductive contact with the outer shell or surface of the heat exchanger tube 88. Spray injectors 58 spray a controlled stream, spray, mist or the like of water onto the heat exchanger tube 88. Steam is generated, as discussed above, and passed through a generator or the like. In order to incorporate the optional hydrogen generation aspect of the invention, an inner surface of the housing 86, or more typically the outer surface of a heat exchanger tube 88' is coated with the catalytic substrate, such as nickel hydride strips 92. Hydrogen can be generated and collected, as described above.

The closed loop steam system of the present invention has many advantages, including reducing global warming by recapturing much of the intense heat emitted from an internal combustion engine and exhaust system. As indicated above, the filtered water is recycled in the condenser for long distance driving. Additionally, the recaptured heat from the exhaust steam can be used to process or generate hydrogen with readily available nickel hydride plates as catalysts. The hydrogen can be used as a fuel for the gas engine during cold engine start-up to achieve a near zero emission vehicle rating, power a fuel cell that would serve as an electrical supercharger and enable very high speed electric only drive power, or as an alternative fuel for purposes other than the vehicle.

Figure 9:
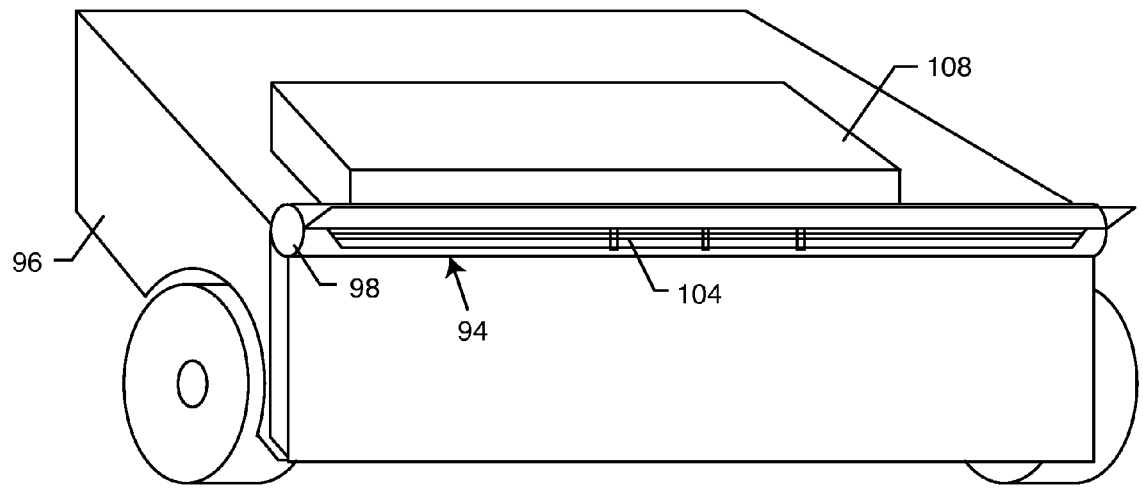
FIG. 9 is a diagrammatic view illustrating a wind turbine operably disposed on a vehicle, in accordance with the present invention.
Figure 10:
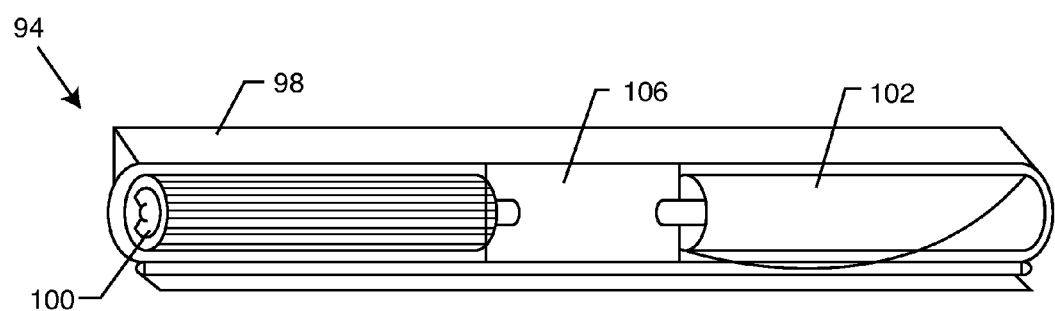
FIG. 10 is a partially sectioned view of a pair of wind turbines used in accordance with the present invention.

With reference now to FIGS. 9 and 10, in addition to the embodiments discussed above, or entirely separate from and independent, wind turbines 94 can be mounted to the vehicle at location of air dams and/or the optimal point of venturi effect in automobile spoilers and the like. For example, in FIG. 9, a wind turbine 94 is located at a rear end or tailgate of a vehicle 96. The wind turbines 94 include a housing 98 having one or more turbines 100 operably disposed therein. In a particularly preferred embodiment, the turbines 100 comprise inertial flywheel-weighted turbines rotatably mounted to air-cooled alternators 102. The housings 98 include air inlets and air outlets 104, such that air is passed through the inlet and out the outlet 104 and over the turbine flywheels 100 such that they rotate and generate electricity due to the rotation of the electrical wires and magnets rotating past one another, as is well known in the art. The electricity generated by the turbines 94 is collected at a wire harness and control panel 106, and transferred to one or more batteries 108 mounted on the vehicle.

Figure 11:
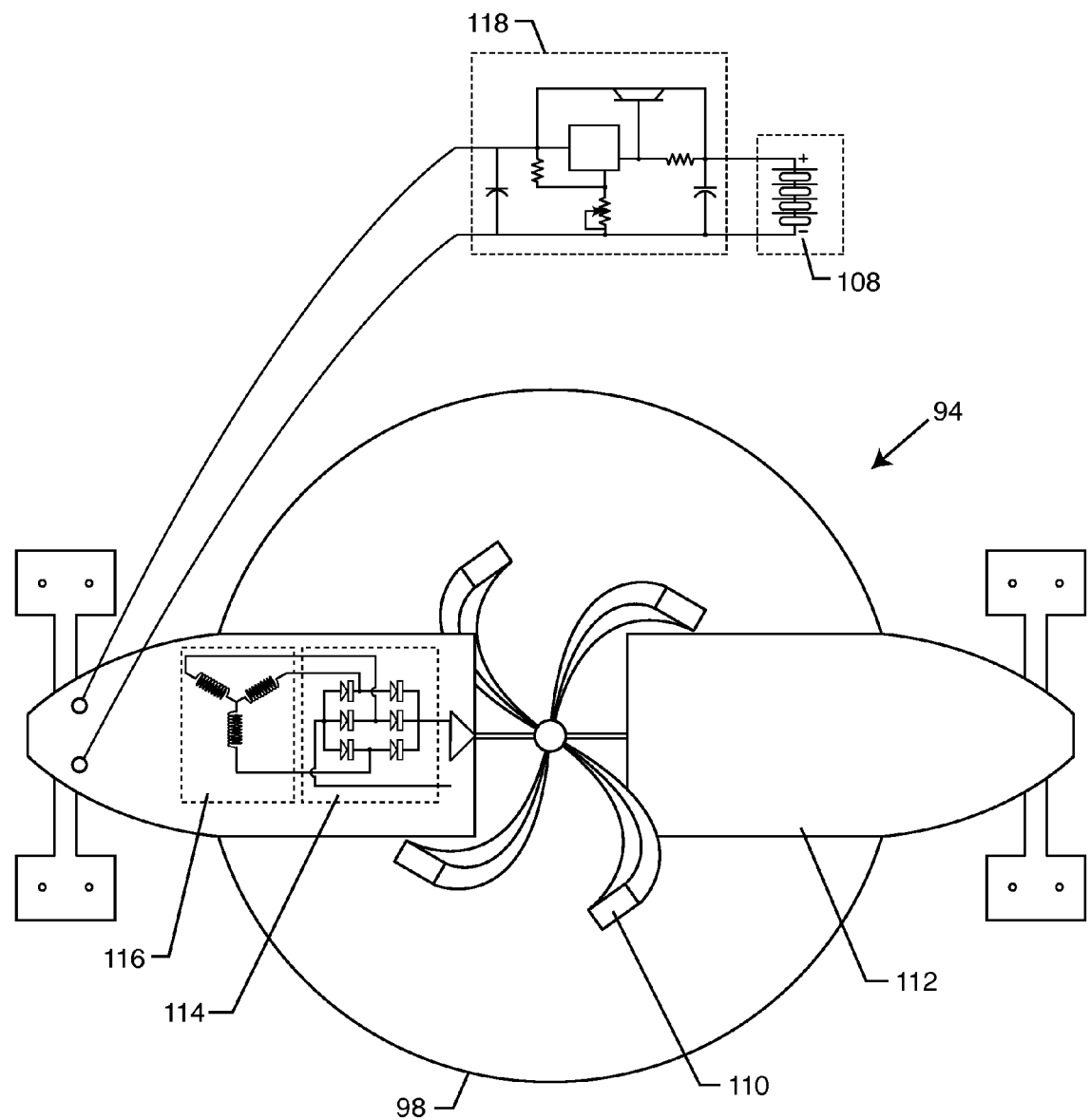
FIG. 11 is a schematic diagram illustrating generation and storage of electricity from the wind turbines, in accordance with the present invention.

With reference to FIG. 11, a schematic diagram illustrating an exemplary turbine 94 is shown, wherein the winged turbine blades 110 are rotatable and interact with a brushless alternator 112 to generate electricity which is passed through a rectifier circuit 114 and armature 116 so as to feed electricity to a regulator 118 and/or batteries 108 of either the vehicle or the storage batteries.

These batteries 108 can then supply electrical energy to the electric drive train of the vehicle as needed. Of course, it will be appreciated by those skilled in the art that the one or more batteries 108 could also comprise fuel cells for delivering power to the vehicle as needed. Electricity would be generated virtually at all times when the vehicle is moving, forcing air to flow through and over the turbines 94. The stock alternator in the automobile 96 would most likely only be necessary during periods of prolonged idling. In fact, the size and demands of current alternators can be reduced or eliminated through increased battery size or improved storage capacity, thereby reducing or eliminating alternator draw and improving fuel consumption and vehicle performance.

In yet another embodiment of the present invention, a process for generating hydrogen utilizing an 8-stroke, 8-cycle internal combustion engine enables the internal combustion engine (typically a V-6 or V-8 engine) to alternate banks of pistons with 4-strokes applied to the generation of power and exhaustion in traditional fashion, and 4-strokes applied to the generation of hydrogen and exhaustion of heat. The addition of an exhaust valve required to route the processed hydrogen through a permeable exchange membrane would be required.

The following illustrates the power cycles and fuel processing cycles of such an 8-cycle engine:

Power Cycle
1. Fuel/Air intake stroke
2. Compression stroke
3. Combustion stroke
4. Exhaust stroke Fuel Processing Cycle
5. Fuel/Steam intake stroke
6. Compression stroke
7. Fuel Processing stroke
8. Exhaust stroke A microprocessor/servo-controlled valve train allows the retrofit of an existing valve train to add a third or fifth valve per cylinder. This enables conversion where all three or five valves are servo actuated. By employing compact servo actuated valves, the duration and volume of the valve operation can be continuously monitored and precisely optimized by computer control-not unlike the mechanical variable valve timing systems currently found on many newer vehicles. This arrangement readily enables the retrofit of the hydrogen exhaust valve while eliminating the mechanical complexity and frictional losses derived from a typical cam driven push rod or overhead cam valve train. Furthermore, the attributes of a racing cam or stock economy cam can be duplicated upon demand. When full power of the internal combustion is required, the secondary fuel processing cycles can be instantaneously shut off so that only the first four cycles of the power cycle are employed.

The systems and methods and described above of the invention may hybridize any 2-wheel or 4-wheel drive vehicle into a multiple-source energy drive system. Moreover, the present invention results in the first self-fueling vehicle of any type. The present invention provides many benefits, including greatly improved fuel economy, reducing foreign oil dependence. The increased top speed of electric drive train allows for highway cruising, and furthermore, the electric drive train can be extended in range by hundreds of miles. The life of the internal combustion engine can be prolonged, and the size and weight necessary for batteries and/or fuel cells and be significantly reduced, increasing vehicle performance. Global warming is reduced by capturing the heat of the exhaust system, and exhaust emissions can be further reduced by fracturing unburned hydrocarbons. Those skilled in the art will appreciate further benefits and advantages of the present invention.

Although several embodiments have been described in detail for purposes of illustration, various modifications maybe made to each without departing from the scope and spirit of the invention. Accordingly, the invention is not to be limited, except as by the appended claims.

What is claimed is:

1. A method for creating energy sources for a vehicle drive system, the method comprising the steps of:
    burning an air fuel mixture in an internal combustion engine;
    discharging the burnt air fuel mixture through an exhaust system;
    creating steam utilizing heat of the exhaust system, including the steps of placing a housing adjacent to a catalytic converter of the exhaust system and injecting water into the housing;
    passing the steam through a generator operably connected to a drive system of the vehicle; and
    monitoring the temperature of the housing and injecting the water into the housing after the housing reaches a predetermined temperature.

2. The method of claim 1, wherein the injecting step comprises the step of spraying water into the housing.

3. The method of claim 1, including the step of compressing the steam and passing the steam through the generator.

4. The method of claim 1, including the step of passing the steam through a Tesla turbine generator.

5. The method of claim 1, including the steps of generating electricity using the generator and supplying the electricity to an electric drive system of the vehicle.

6. The method of claim 5, wherein the electricity is supplied to batteries of the electric drive system of the vehicle.

7. The method of claim 1, including the step of providing power directly from the generator to a mechanical drive system of the vehicle.

8. The method of claim 1, including the steps of mounting a wind turbine onto the vehicle and generating electricity as air passes through the turbine due to movement of the vehicle.

9. The method of claim 8, including the step of supplying the electricity generated by the wind turbine to a battery or to a voltage regulator of the vehicle's electrical system.

10. A method for creating energy sources for a vehicle drive system, the method comprising the steps of:
    burning an air fuel mixture in an internal combustion engine;
    discharging the burnt air fuel mixture through an exhaust system;
    creating steam utilizing heat of the exhaust system;
    creating hydrogen by passing the steam over a catalyst substrate;
    mixing the steam with exhaust from the internal combustion engine before it is passed through a catalytic converter of the exhaust system and passing the steam and exhaust mixture over the catalyst substrate; and
    passing the steam through a generator operably connected to a drive system of the vehicle.

11. The method of claim 10, wherein the catalyst substrate comprises nickel hydride.

12. The method of claim 10, including the steps of collecting the hydrogen utilizing a permeable exchange membrane and storing the hydrogen in a tank.

13. A method for creating energy sources for a vehicle drive system, the method comprising the steps of:
    burning an air fuel mixture in an internal combustion engine;
    discharging the burnt air fuel mixture through an exhaust system;
    placing a housing adjacent to a catalytic converter of the exhaust system;
    creating steam by injecting water into the housing heated by the exhaust system, including the step of spraying the water into the housing after the housing reaches a predetermined temperature;
    passing the steam through a generator; and
    generating electricity using the generator and supplying the electricity to an electric drive system of the vehicle.

14. The method of claim 13, including the step of compressing the steam and passing the steam through a generator.

15. The method of claim 13, including the step of passing the steam through a Tesla turbine generator.

16. The method of claim 13, including the step of creating hydrogen by passing the steam over a catalyst substrate.

17. The method of claim 16, including the step of mixing the steam with exhaust from the internal combustion engine before it is passed through a catalytic converter of the exhaust system and passing the steam and exhaust mixture over the catalyst substrate.

18. The method of claim 16, wherein the catalyst substrate comprises nickel hydride.

19. The method of claim 16, including the steps of collecting the hydrogen utilizing a permeable exchange membrane and storing the hydrogen in a tank.

20. The method of claim 13, including the steps of mounting a wind turbine onto the vehicle and generating electricity as air passes through the turbine due to movement of the vehicle, and supplying the electricity generated by the wind turbine to a battery or to a voltage regulator of the vehicle's electrical system.

21. A method for creating energy sources for a vehicle drive system, the method comprising the steps of:

burning an air fuel mixture in an internal combustion engine;

discharging the burnt air fuel mixture through an exhaust system;

placing a housing adjacent to a catalytic converter of the exhaust system;

creating steam by injecting water into the housing heated by the exhaust system;

creating hydrogen by passing the steam over a catalyst substrate;

mixing the steam with exhaust from the internal combustion engine before it is passed through a catalytic converter of the exhaust system and passing the steam and exhaust mixture over the catalyst substrate;

passing the steam through a generator; and generating electricity using the generator and supplying the electricity to an electric drive system of the vehicle.

* * * * *